United States Patent
Link et al.

[11] Patent Number: 5,538,279
[45] Date of Patent: Jul. 23, 1996

[54] COLLISION-PROTECTION DEVICE FOR VEHICLE PASSENGERS

[75] Inventors: Manfred Link, Waiblingen; Ulrich Tschäschke, Ehningen; Manfred Müller, Deizisau; Helmut Patzelt, Kernen, all of Germany

[73] Assignee: Mercedes Benz AG, Stuttgart, Germany

[21] Appl. No.: 91,930

[22] Filed: Jul. 16, 1993

[30] Foreign Application Priority Data

Jul. 18, 1992 [DE] Germany ............... 42 23 775.0

[51] Int. Cl.⁶ ............................................. B60R 21/30
[52] U.S. Cl. .................................................... 280/739
[58] Field of Search ...................... 280/728 R, 739, 280/743 R, 731, 738, 743 A

[56] References Cited

U.S. PATENT DOCUMENTS

| | | | |
|---|---|---|---|
| 3,527,475 | 9/1970 | Carey et al. | 280/739 |
| 3,580,603 | 5/1971 | Chute | 280/731 |
| 4,805,930 | 2/1989 | Takada | 280/743 R |
| 5,007,662 | 4/1991 | Abramczyk et al. | 280/739 |
| 5,071,161 | 12/1991 | Mahon et al. | 280/743 R |
| 5,193,847 | 3/1993 | Nakayama | 280/739 |

FOREIGN PATENT DOCUMENTS

| | | |
|---|---|---|
| 1935426 | 1/1970 | Germany. |
| 1680034 | 7/1972 | Germany. |
| 8800530 | 4/1988 | Germany. |
| 1408084 | 10/1975 | United Kingdom. |
| 2237249 | 5/1991 | United Kingdom. |

OTHER PUBLICATIONS

British Examiner's Search Report.

*Primary Examiner*—Karin L. Tyson
*Assistant Examiner*—Paul N. Dickson
*Attorney, Agent, or Firm*—Evenson, McKeown, Edwards & Lenahan

[57] ABSTRACT

Collision-protection devices for vehicle passengers, are disclosed which include a gas cushion which is connected to a gas generator and inflates under sensor control in the event of an accident and hence protects the body of a vehicle passenger from a collision causing injury, e.g., against the instrument panel or windscreen. The gas cushion has, in this instance, one or more escape openings. According to the invention, the escape opening points towards an open cover flap when the gas cushion is inflated, which cover flap, in the closed state, covers the folded-up gas cushion. Only once a predetermined pressure has been exceeded does the cover flap free the escape opening to enable gas to be discharged in an escape flow distributed over an area of the gas cushion surface.

6 Claims, 1 Drawing Sheet

5,538,279

COLLISION-PROTECTION DEVICE FOR VEHICLE PASSENGERS

BACKGROUND AND SUMMARY OF THE INVENTION

The invention relates to a collision-protection device for vehicle passengers, comprising a gas cushion which is connected to a gas generator and is covered, in the folded-up state, by a cover flap, there being disposed on the gas cushion at least one escape opening for the controlled discharge of gas in the inflated state of the gas cushion.

Collision-protection devices of this type are known. For instance, German Patent Document DOS 19 35 426 describes a safety device housed in the steering mechanism of a vehicle and having a collapsed casing, wherein, during a collision, means for generating a flow of fluid cause the casing to expand into bearing contact against a part of the steering mechanism. In order to reduce the recoil of the driver when hitting against the casing, two blow-out mechanisms are provided in the base part of the casing. These are formed by essentially circular patches or sections which are fitted on the inner side of the casing and block off essentially circular openings. If there is a certain pressure present within the casing, the blow-out patches are torn away from the seam by which they are fastened to the base of the casing, thereby allowing fluid to flow out of the casing through the openings.

From German Patent 16 80 034, a further safety device for the protection of vehicle passengers is known, the bag of which, which is inflated in the event of an accident, exhibits a predetermined breaking point which is normally closed and is only burst open once a certain pressure obtaining in the bag has been exceeded. This predetermined breaking point comprises an opening in the bag, which opening is covered by a patch, the patch consisting of a weaker or thinner material than the bag.

In German Patent Document DE-GM 88 00 530, a collision-protection device for a vehicle passenger is described, the gas cushion of which is connected to a gas generator and exhibits four circular escape openings through which the filler gas blown into the gas cushion by the gas generator is able to escape. The escape openings are in this case obstructed by a closing part made from elastic, deformable material. A centrically disposed recess is disposed on this closing part, the cross-section of which recess is substantially smaller, in the rest state, than the cross-section of the escape opening of the gas cushion. This recess in the closing part changes its cross-section in dependence upon the internal pressure of the gas cushion, i.e. it automatically expands, in dependence upon the pressure situation, up to a maximum or then automatically diminishes again if the pressure should fall.

An object of the invention is to construct escape openings for gas cushions of collision-protection devices without additional closing parts or patches which have to be fitted to the gas cushion and seal off the escape opening or reduce its cross-section, the said escape openings allowing a controlled inflation of the gas cushion and a directed, areally distributed escape of gas from the gas cushion.

This object is achieved according to the invention by the fact that, in a collision-protection device for vehicle passengers of the above-mentioned type, the at least one escape opening points towards an open cover flap and is covered by this, at least when the gas cushion is inflated.

The cover flap situated in front of the escape opening acts as a valve for the escape opening, which valve effects a directed escape of gas from the inflated gas cushion whenever load is applied to it by a passenger. In particular, the open cover flap ensures an areally distributed escape of gas, thereby preventing body parts of the passenger from being directly caught in the flow. This helps to prevent hand and forearm injuries in the form of burns, since the gases, when escaping, have a high temperature. In a corresponding arrangement of the gas cushion in the folded state, the cover flap covers the escape opening throughout the inflation operation. It is not until the gas cushion is inflated that the cover flap, once a certain pressure in the gas cushion is exceeded, frees the escape opening to enable gas to be discharged.

Other objects, advantages and novel features of the present invention will become apparent from the following detailed description of the invention when considered in conjunction with the accompanying drawings.

DETAILED DESCRIPTION OF THE DRAWINGS

Figure 1:
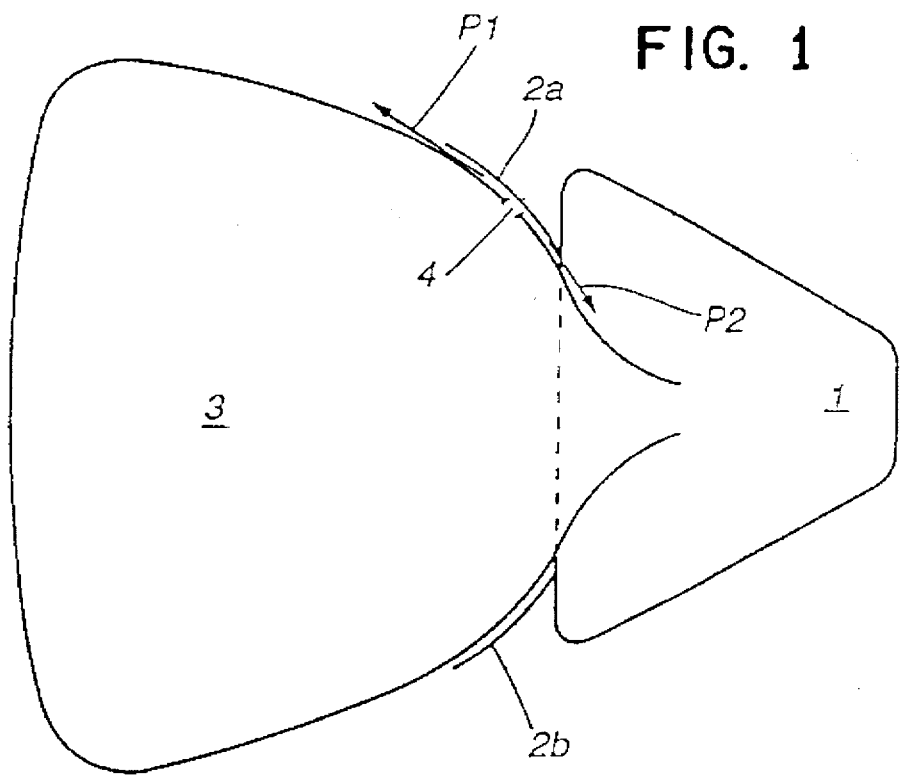
FIG. 1 schematically shows a collision-protection device according to the invention, housed in the steering wheel of a vehicle, in the inflated state.

The diagrammatic representation of the FIG. 1 shows the collision-protection device, housed in the hub (1) of a steering wheel of a vehicle, in its inflated state in the event of an accident. Cover flaps (2a, 2b), which are fitted on that side of the steering wheel hub (1) pointing towards the driver (not represented) and which, in the closed state, cover a gas cushion folded up in the interior of the steering wheel hub (1), are open, thereby freeing an opening in the steering wheel hub (1) through which the inflated gas cushion (3) extends into the interior of the passenger compartment. The inflated gas cushion (3) extends in the interior of the passenger compartment, in front of the steering wheel hub (1) and an instrument panel (not represented) and the windscreen, in such a way that the body of the driver, which is accelerated due to the consequences of the accident, is protected from a collision causing injury.

Figure 2:
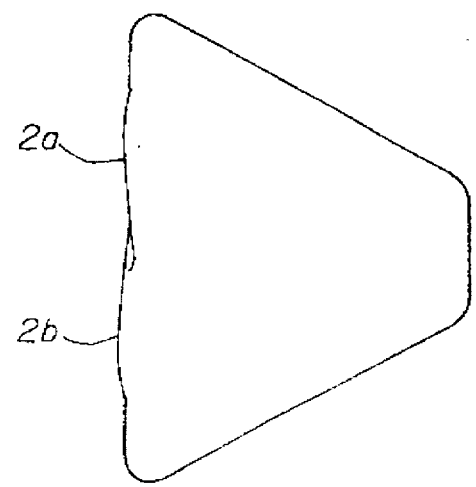
FIG. 2 is a schematic view showing the collision-protection device of FIG. 1 in an uninflated folded condition.

FIG. 2 schematically depicts the gas cushion 3 in a folded condition interior of the steering wheel hub.

In order to cushion, sufficiently softly, the collision of the driver against the gas cushion (3) and minimize his recoil from the gas cushion (3), the gas cushion (3) has an escape opening (4). The escape opening (4) is disposed in that upper region of the gas cushion (3) facing the steering wheel (1) and points in the direction of the cover flap (2a). The cover flap (2a) covers the escape opening (4) of the gas cushion (3) throughout the inflation operation, so that no or only a little gas is able to escape from the inflating gas cushion (3). It is only when the driver collides against the gas cushion (3) and there is an associated increase in the gas pressure in the interior of the gas cushion (3) over and above a predetermined value that the cover flap (2a) acting as a valve frees the escape opening (4) to enable gas to be discharged. The cover flap (2a) hereupon exercises upon the discharged gas a flow-conducting function in the direction of the drawn-in arrows (P1, P2), thereby producing a distributed escape of gas. This can be aided, for example, by the configuration of suitable, channel-like conduits on the underside of the cover flap (2a).

The escape opening (4) is an essentially circular punch hole in the casing material of the gas cushion (3). If a gas cushion has a plurality of escape openings, e.g. also pointing to the lower cover flap (2b), then the individual openings can be provided with a correspondingly smaller cross-section. It is possible, furthermore, to create the at least one escape opening (4) from a net-like fabric part which lies exposed at the appropriate spot in the gas cushion (3). A more complex construction of this kind helps to give greater strength to the gas cushion (3).

Figure 3:
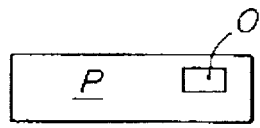
FIG. 3 schematically depicts an embodiment of the invention with the collision-protection device disposed in an instrument panel in front of a vehicle passenger seat.

The illustrative embodiment represented in the drawing relates to a collision-protection device housed in a steering wheel of a vehicle. Embodiments of the invention are also contemplated which can also be used in collision-protection devices D disposed elsewhere, e.g. in the instrument panel P in front of the passenger seat schematically depicted in FIG. 3.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An airbag system for protecting vehicle passengers in event of a vehicle collision, comprising:

a gas cushion housing;

a gas cushion which is housed in the gas cushion housing in a folded-up non-inflated condition and which is inflatable to an unfolded inflated condition protruding out of said housing to form an impact cushion for a vehicle passenger in the event of a vehicle collision, said gas cushion including at least one escape opening for controlled discharge of gas when the gas cushion is inflated; and a cover flap fitted to the housing and covering the gas cushion when in a folded uninflated condition in the housing, said cover flap covering and overlapping the at least one escape opening during inflation of the gas cushion and being movable with respect to the gas cushion in response to excess pressure in the gas cushion to provide controlled escape of gas through the at least one escape opening into a space between the cover flap and an outer surface of the gas cushion.

2. An airbag system according to claim 1, wherein the gas cushion housing is disposed at a vehicle steering wheel, and wherein the at least one escape opening is disposed in an upper side of the gas cushion in the inflated condition of the gas cushion.

3. An airbag system according to claim 1, wherein the cover flap is disposed to cover the at least one escape opening so that at most a small flow of gas is able to escape from the inflating gas cushion until the passenger collides against the gas cushion and causes an associated increase in pressure above a predetermined pressure to thereby cause the flap to act as a valve to free the at least one escape opening.

4. An airbag system according to claim 2, wherein the cover flap is disposed to cover the at least one escape opening so that at most a small flow of gas is able to escape from the inflating gas cushion until the passenger collides against the gas cushion and causes an associated increase in pressure above a predetermined pressure to thereby cause the flap to act as a valve to free the at least one escape opening.

5. An airbag system according to claim 1, wherein the gas cushion housing is disposed at a vehicle instrument panel in front of a front passenger seat, and wherein the at least one escape opening is disposed in an upper side of the gas cushion in the inflated condition of the gas cushion.

6. An airbag system according to claim 3, wherein the gas cushion housing is disposed at a vehicle instrument panel in front of a front passenger seat, and wherein the at least one escape opening is disposed in an upper side of the gas cushion in the inflated condition of the gas cushion.

* * * * *